(12) United States Patent
Wieringa et al.

(10) Patent No.: US 8,276,312 B2
(45) Date of Patent: Oct. 2, 2012

(54) LINES HAVING SHAPED SURFACE AND METHOD OF MAKING

(75) Inventors: Jeffrey L. Wieringa, West Lakeland, MN (US); Daniel R. Croswell, Brooklyn Park, MN (US); Linda Croswell, legal representative, Brooklyn Park, MN (US); John C. Clark, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/663,298

(22) PCT Filed: Jun. 6, 2008

(86) PCT No.: PCT/US2008/066158
§ 371 (c)(1),
(2), (4) Date: May 25, 2010

(87) PCT Pub. No.: WO2008/154403
PCT Pub. Date: Dec. 18, 2008

(65) Prior Publication Data
US 2010/0257770 A1  Oct. 14, 2010

Related U.S. Application Data

(60) Provisional application No. 60/942,702, filed on Jun. 8, 2007, provisional application No. 61/043,595, filed on Apr. 9, 2008.

(51) Int. Cl.
*A01K 91/12* (2006.01)

(52) U.S. Cl. ............................ 43/44.98; 428/397

(58) Field of Classification Search .................. 43/44.98; 428/373, 374, 394, 395, 397, 399, 400; *A01K 91/00, A01K 91/12*
See application file for complete search history.

(56) References Cited

U.S. PATENT DOCUMENTS

| | | |
|---|---|---|
| 3,043,045 A | 7/1962 | Martuch |
| 3,523,034 A | 8/1970 | Howald |
| 3,830,009 A | 8/1974 | Collingbourne |
| 3,868,785 A | 3/1975 | Foote |
| 3,914,480 A | 10/1975 | Lang |
| 4,048,744 A | 9/1977 | Chandler |
| 4,321,854 A | 3/1982 | Foote et al. |
| 4,729,187 A * | 3/1988 | DiGioia ............... 43/44.98 |
| 5,296,292 A | 3/1994 | Butters |
| 5,303,498 A | 4/1994 | Yutori et al. |
| 5,354,616 A | 10/1994 | Fish, Jr. et al. |
| 5,625,976 A | 5/1997 | Goodale |
| 6,171,697 B1 * | 1/2001 | Legrand ............... 428/372 |
| 6,671,997 B2 | 1/2004 | Lindgren |
| 6,753,380 B2 | 6/2004 | Qiu |
| 7,172,810 B2 | 2/2007 | Hashimoto et al. |

(Continued)

FOREIGN PATENT DOCUMENTS

JP   11-164639   6/1999

(Continued)

*Primary Examiner* — Darren W. Ark
*Assistant Examiner* — Lisa Tsang
(74) *Attorney, Agent, or Firm* — Lisa P. Fulton

(57) ABSTRACT

A fishing line comprises an outer surface having at least one array of shaped features therein and having an advancing contact angle with deionized water of at least about 115°. The array comprises a plurality of discrete shaped features spaced equidistantly along a longitudinal axis of the fishing line. The shaped features are from about 0.005 to about 0.02 inches across in their broadest dimension.

12 Claims, 3 Drawing Sheets

U.S. PATENT DOCUMENTS

2004/0077775 A1    4/2004    Audenaert et al.
2008/0127543 A1*   6/2008    Wothers .................. 43/44.98

FOREIGN PATENT DOCUMENTS

| | | |
|---|---|---|
| JP | 11164639 A * | 6/1999 |
| KR | 20-0344829 | 3/2004 |
| WO | WO 92/03922 A1 | 3/1992 |
| WO | WO 98/14650 A2 | 4/1998 |
| WO | WO 2006/031409 A2 | 3/2006 |
| WO | WO 2006031409 A2 * | 3/2006 |

* cited by examiner

US 8,276,312 B2

LINES HAVING SHAPED SURFACE AND METHOD OF MAKING

CROSS REFERENCE TO RELATED APPLICATIONS

This application is a national stage filing under 35 U.S.C. 371 of PCT/US2008/066158, filed Jun. 6, 2008, which claims priority to U.S. Provisional Application No. 60/942,702, filed Jun. 8, 2007, and U.S. Provisional Application No. 61/043,595, filed Apr. 9, 2008, the disclosures of which are incorporated by reference in their entirety herein.

PRIORITY CLAIM

This application claims the benefit of U.S. Provisional Patent Application No. 60/942,702, filed Jun. 8, 2007, and of U.S. Provisional Patent Application No. 61/043,595, filed Apr. 9, 2008.

FIELD OF INVENTION

The present invention relates to lines, such as fishing lines, having a shaped surface to enhance performance of the line as desired and to methods for manufacturing such lines.

BACKGROUND

Currently, fishing lines, including fly fishing lines, are generally made with a smooth surface. Fishing lines may be monofilament, polyfilament (e.g., braided or twisted), or composite (e.g., multilayer with core and jacket or outer layer) construction. Suggestions have been made to modify the properties of the fishing line by selecting the component materials for desired properties, e.g., desired elongation, elasticity, strength, slipperiness, slickness, and by incorporating material in the fishing to impart desired properties, e.g., density reducing particles to improve floatation.

Some illustrative examples include U.S. Pat. No. 3,043,045 (Martuch); U.S. Pat. No. 3,523,034 (Howald); U.S. Pat. No. 3,830,009 (Collingborne); U.S. Pat. No. 3,868,785 (Foote); U.S. Pat. No. 3,914,480 (Lang); U.S. Pat. No. 4,048,744 (Chandler); U.S. Pat. No. 4,321,854 (Foote et al.); U.S. Pat. No. 5,296,292 (Butters); U.S. Pat. No. 5,303,498 (Yutori et al.); U.S. Pat. No. 5,354,616 (Fish Jr. et al.); and U.S. Pat. No. 5,625,976 (Goodale); and PCT Publication Nos. WO92/03922 (Butters); WO98/14650 (Cook); and WO2006/031409 (Harder et al.).

AIRFLO™ Ridge Tactical Trout Fly Line has tiny ridges running longitudinally along the entire length of the line such that in cross section the line appears like a gear with a series of peaks and valleys around its circumference.

The need exists for fishing lines with improved performance properties including casting performance, reduced drag retrieval in water, and, as desired, increased floating characteristics or increased sinking characteristics.

SUMMARY OF INVENTION

The present invention provides fishing lines with improved performance properties. The present invention also provides a method of making such fishing lines.

In brief summary, fishing lines of the invention have one or more arrays of shaped features in the outer surface thereof.

Briefly summarizing, the method of the invention comprises (a) providing a fishing line having an outer surface and (b) forming at least one array of shaped features in at least a portion of the outer surface of the line.

Fishing lines of the invention provide improved performance properties including better floatability in water due to modified meniscus properties at the line/water interface, greater durability, e.g., due to reduced wear against rod components, greater shootability due to reduced contact with rod guides, lower memory especially under cold conditions, greater flexibility. As a result, persons fishing with such lines will enjoy many benefits including but not limited to improved casting performance, reduced drag retrieval in water, etc.

BRIEF DESCRIPTION OF DRAWING

The invention will be further explained with reference to the drawing, wherein.

These figures, which are idealized, are not to scale and are intended to be merely illustrative and non-limiting.

DETAILED DESCRIPTION OF INVENTION

As do conventional fishing lines, fishing lines of the invention have a long thin shape. They may be made in any length desired. The lines should be sufficiently flexible to be repeatedly wound and unwound into roll form for storage, transfer to a reel, casting, etc.

In many embodiments, the lines have a generally circular cross section modified by the one or more arrays of features described herein. The thickness or cross sectional diameter of the lines may be substantially uniform throughout the entire length, i.e., along the longitudinal axis of the line, or they may vary as desired. For instance, to enhance casting a line can be tapered to add weight in a desired portion to provide mechanical advantage to the cast and also to "load the rod", i.e., develop more potential energy therein to increase the energy exploited during casting. This taper can also be configured to enhance "roll over", i.e., the ability to carry and roll the line out straight with a fly or lure attached to it.

Typically, the average cross sectional diameter of fishing lines of the invention will be between about 0.025 and about 0.116 inch, preferably between about 0.035 and 0.080 inch though lines of other average diameter may be made if desired.

Fishing lines of the invention may be made with other modifications as is known in the art. For example, incorporation of slip agents within the outer portion of the line to modify its slip or glide across rod guides, colorants, fillers (e.g., glass, plastic, etc. particles or microballons) to modify buoyancy of the line, ultraviolet absorbers, etc. Various known techniques for modifying the memory and stiffness of the line as desired may be used.

Fishing lines of the invention may be monofilament, polyfilament, or composite as desired.

Figure 1:
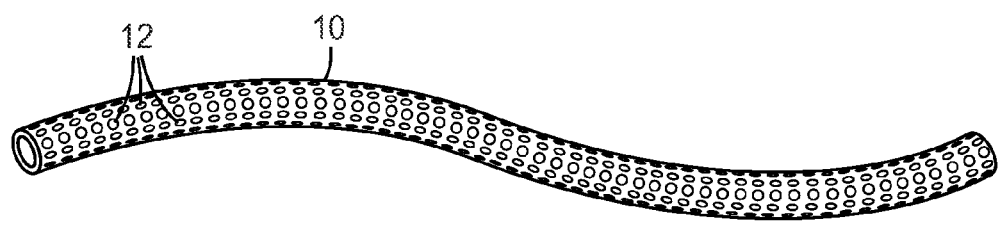
FIG. 1 is a perspective view of a portion of one illustrative embodiment of a fishing line of the invention.

Fishing lines of the invention differ from conventional fishing lines in that the outer layer thereof (which may be the only layer in monofilament embodiments and certain composite embodiments) has at least one array of shaped features in the outer surface thereof. An illustrative embodiment of a fishing line of the invention is shown in FIG. 1. In this embodiment, fishing line 10 has array 12 of shaped features in the outer surface thereof.

The outer layer of fishing lines of the invention comprises a polymeric material. Preferably the outer layer comprises a thermoplastic polymeric material, though lines can be made using thermoset materials for the outer layer if desired. Illustrative examples of materials that may be used the outer layer of lines of the invention include polyurethane, polyvinyl chloride, and polyethylene. In the case of monofilament lines, the outer layer essentially constitutes the fishing line; in the case of composite monofilament lines, the outer layer is a substantially continuous matrix of the polymeric material and further contains domains of other materials, e.g., hollow glass microspheres to enhance flotation. In the case of polyfilament lines, the outer layer surrounds one or more core filaments (which may be braided if desired); in the case of composite polyfilament lines, the outer layer or core filament may contain or surround domains of other materials if desired.

The array(s) of shaped features are arranged substantially along the longitudinal axis of the fishing line. The shaped features may be protrusions from the outer surface of the line, depressions into the outer surface of the line, or combinations as desired.

The fishing line may comprise two or more arrays of shaped features. In some embodiments, the line may comprise two more arrays within the same longitudinal segments. In some embodiments, the line may comprise at least two longitudinal segments having different arrays of shaped features.

The thickness or cross sectional diameter of the line may be substantially uniform throughout the entire length, i.e., along the longitudinal axis of the line, or may vary as desired, within a longitudinal segment or between longitudinal segments.

Figure 2:
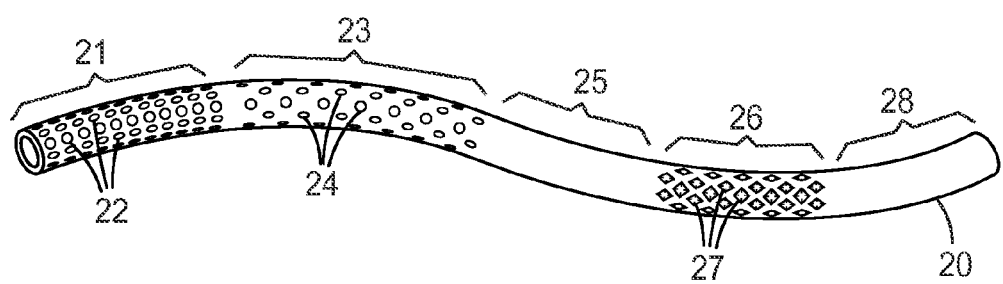
FIG. 2 is a perspective view of a portion of a second illustrative embodiment of a fishing line of the invention.

Turning to FIG. 2, another illustrative embodiment of the invention is fishing line 20 in which longitudinal segment 21 has array 22 of shaped features in the outer surface, longitudinal segment 23 has array 24 of shaped features in the outer surface wherein array 22 and array 24 differ. In addition, longitudinal segments 25 and 28 have a generally smooth outer surface with no shaped features formed therein and longitudinal segment 26 has array 27 of shaped features wherein array 27 differs from arrays 22 and 24. It will be understood that other embodiments may be made in accordance with the present invention.

The size, shape, orientation, and spacing of the shaped features in each array are selected according to desired impact or effect that it will impart to the fishing line. For example; shaped features may be chosen to increase the tendency of air bubbles to become trapped to the surface of the line when it is in water to increase buoyancy of the line; shaped features may be chosen to reduce the noise or increase or decrease drag as the line passes through the guides of a fishing rod; shaped features may be chosen to alter the way the line passes through air or water; etc. Lines may be made to enhance or impart desired characteristics to different portions of the lines as desired.

The specific shape and dimensions of the features can be selected as desired according to the desired performance attributes sought. Typically, the ratio of the length of each feature (i.e., in the axis parallel to the longitudinal axis of the line) to the perpendicular dimension of the width of the feature (i.e., its dimension along the curvature of the line perpendicular to the longitudinal axis) is from 5:1 to 1:5.

Small dimples have been observed to decrease wind resistance of the line, thereby yielding greater casting distances. Cross hatch patterns have been observed to increase the surface tension of line thereby decreasing the energy required to release water such that the lines float higher on the surface of water. Shaped features having other geometries may be used if desired, e.g., fish scale shaped features to modify ease with which the line is pulled through water, and diamond shaped features (e.g., such as an X-shaped depression in the outer surface of the line) to reduce wear on fishing pole guides and to induce entrapment of air bubbles to increase buoyancy. In some embodiments, shaped features will be selected to increase or decrease buoyancy of the line, to increase or decrease drag of the line on components of the rod or in air or in the water, or to decrease noise.

The size of the shaped features may vary depending upon the desired impact or properties to be imparted to the line and dimension of the line, particularly its diameter. Depending upon the embodiment, the shaped features may range from about 0.005 to about 0.02 inch, across in their broadest dimension. As will be understood, shaped features of other dimensions may be used in accordance with the invention.

Different shaped features may be provided along different longitudinal segments of the line as desired to impart differential properties to different portions of the line. For example, a line may be made with (1) shaped features selected to impart slightly negative buoyancy to the portion of a line closest to the lure or fly, (2) shaped features selected to impart greater buoyancy to the next portion of the line, and (3) shaped features selected to reduce drag (thereby increasing castability) to the next segment of the line.

Although the invention has been described with respect to fishing lines, it will be understood that lines of the invention may be used for other applications. Illustrative examples include kite strings, tow lines to draw objects beyond vehicles moving through air and/or water, nets, e.g., to be used for fishing, wire communication lines, guy wires, e.g., used to support towers and other structures located in water and dry land locations.

In brief summary, fishing lines of the invention are made by forming the line with desired construction, i.e., monofilament (composite or not as desired) or polyfilament (composite or not as desired), and forming the array(s) of shaped features in the outer layer thereof. The line is flexible and preferably substantially dimensionally stable during conditions of use (some tendency to stretch to permit winding, tying of knots, etc. is acceptable or even desired). The outer layer must be deformable, such as by thermal embossing, to permit formation of the array(s) of shaped features in accordance with the invention.

Figure 3:
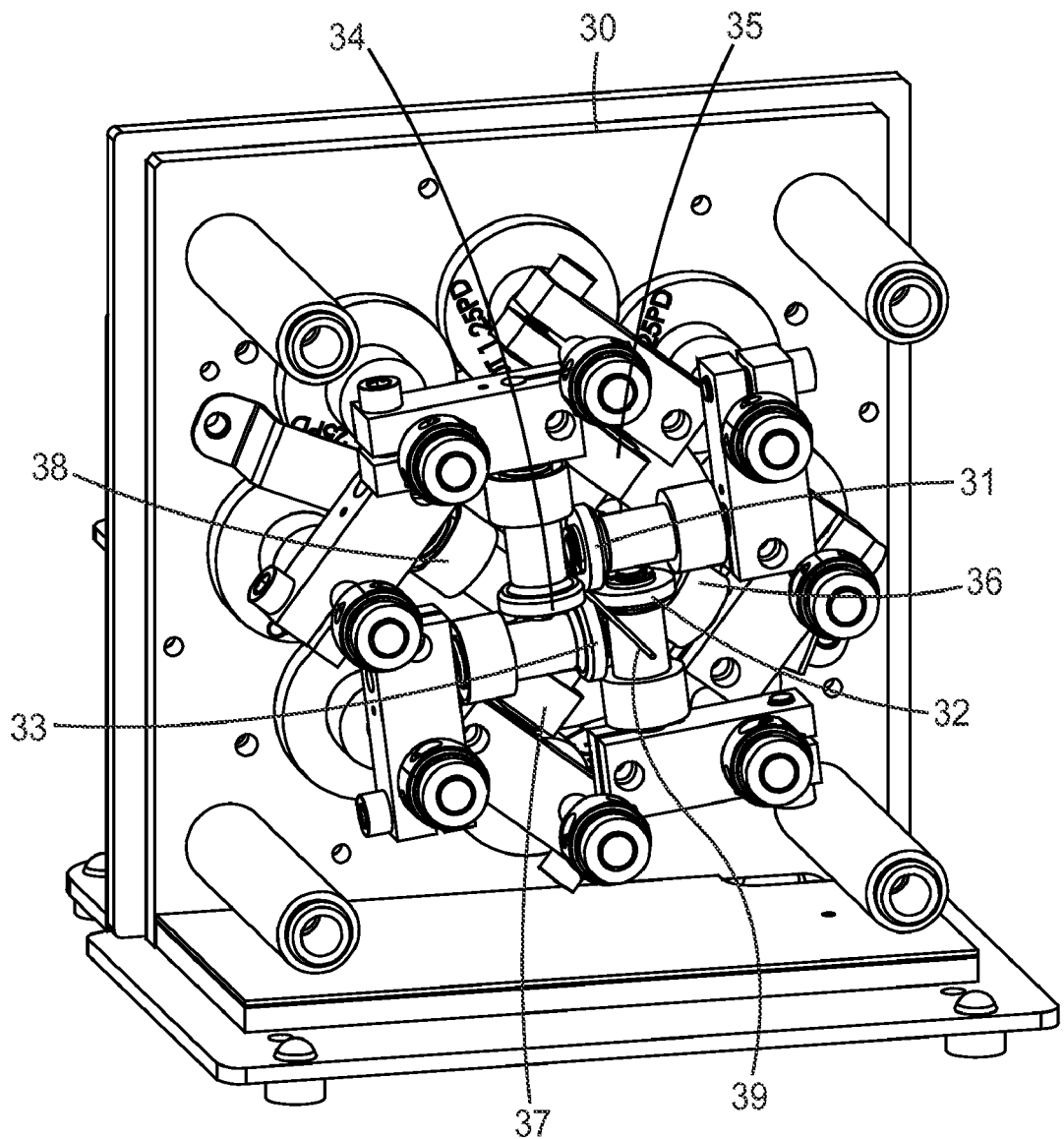
FIG. 3 is a perspective view of one embodiment of an apparatus for making fishing line of the invention.

In preferred embodiments, the array(s) of shaped features can be formed by embossing the line. Especially preferred are continuous embossing operations An illustrative example of an apparatus for carrying out such embossing is shown in FIG. 3 wherein apparatus 30 features eight embossing rollers 31, 32, 33, 34, 35, 36, 37, and 38. The rollers, arranged in this embodiment in two juxtaposed sets of four rollers each, to define two embossing zones (rollers 31, 32, 33, and 34 defining one embossing zone and rollers 35, 36, 37, and 38 defining a second embossing zone which is obscured in this view). Selection of the number of rollers in each embossing zone is a matter of design. Typically, an even number of rollers which are each positioned to apply pressure on opposing sides of the line is preferred in each embossing zone. In the case of fishing lines, 4 to 8 embossing roller in an embossing zone is effective. In embodiments where thicker lines are being manufactured, a greater number of rollers in each embossing zone may be used; depending upon the dimensional integrity of the line, it is not necessary to arrange embossing rollers in opposing pairs.

In the embodiment shown here, the rollers in each juxtaposed set or embossing zone are positioned in coordinated fashion as mechanical iris to engage with the line as desired. Through arrangement of gears and connection apparatus, each of the rollers is positioned against the outer surface of the line in equivalent fashion and to apply substantially equal pressure.

The fishing line 39 is passed through the embossing zones under conditions of suitable temperature, pressure, and speed to achieve appropriate dwell conditions to deform the outer layer of the fishing line and form the desired shaped features in the outer surface thereof.

Different embossing zones may be embossingly engaged to different longitudinal segments of the line as it passes through as desired.

Selection of the conditions will be dependent in part upon the dimensions and composition of the line being embossed and may be readily selected by those skilled in the art. For example, in the case of line having a polyvinyl chloride ("PVC") outer layer, the embossing rollers will typically be heated to a temperature of about 300 to about 320° F.

Figure 4:
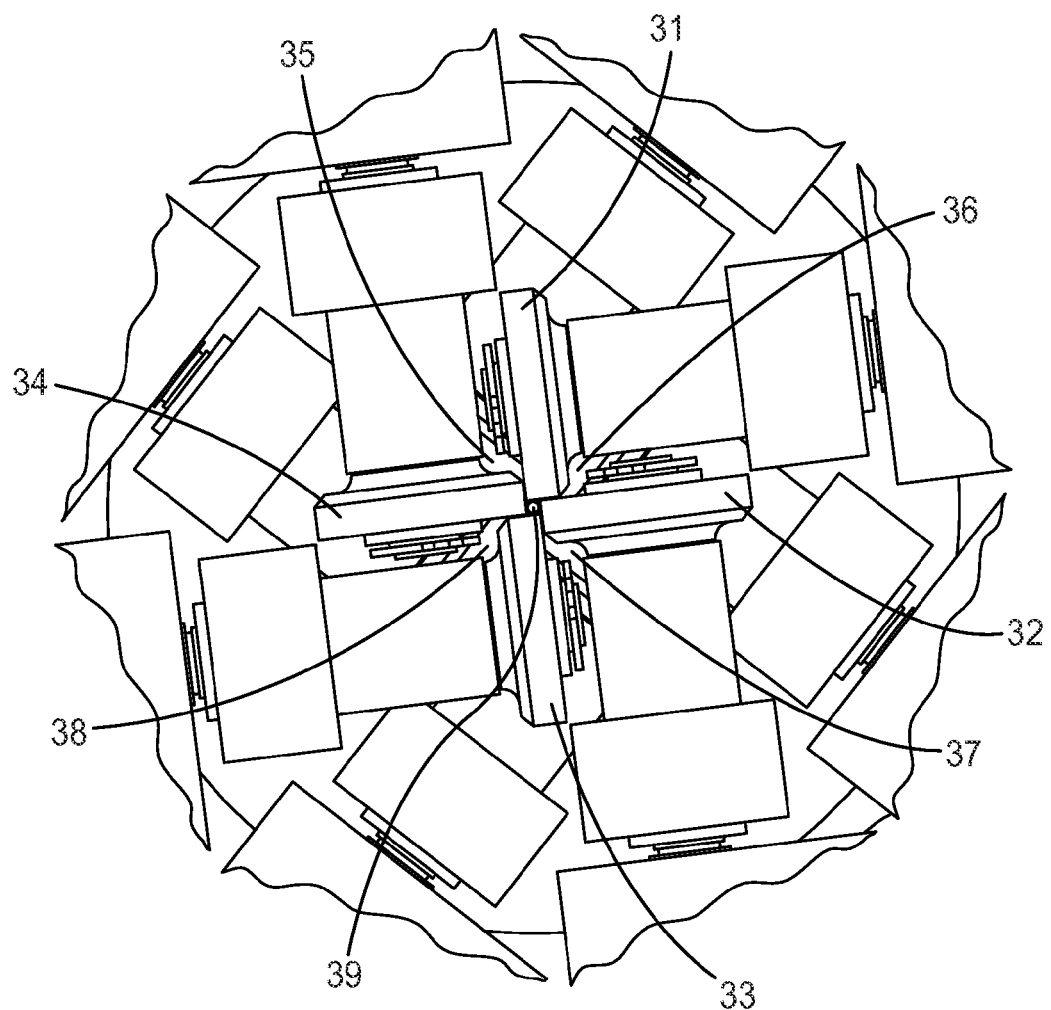
FIG. 4 is a close up of a portion of the apparatus shown in FIG. 3.

FIG. 4 shows a close up of the arrangement of embossing rollers of the apparatus shown in FIG. 3, like reference numbers indicate the same element or component.

The embossing rollers have desired patterns formed therein to define the desired shaped features. If desired, formation of the shaped features can be carried out using fewer or more embossing rollers and/or arranging them in a single or three or more embossing zones.

In the embodiment shown here, the embossing rollers are configured with actuators, shafts, etc. to permit precise adjustment of the position of the rollers with one another. In one embodiment, the embossing rollers are free spinning and embossingly engaged with the line as desired under desired pressure as the line is drawn through the device.

Depending upon the arrays of shaped features which are desired, the embossing faces of the rollers can be separately machined. By engaging different rollers at different portions of the line, i.e., usually by using different embossing zones, different arrays of shaped features can be formed at different longitudinal segments of the fishing line as desired.

It will be understood that arrays of features can be formed in lines in accordance with the invention using other techniques, with the selection being dependent in part upon the line being produced, processing speeds, etc. Some illustrative examples include the following: laser etching, photo/chemical etching, sand blasting and etching, chemical reacting, foaming, gassing (heat reactive where plastic micro-bubbles are heated to expand to form bumps), abrading the exterior surface, e.g., with sanding discs, continuous molding, and over coating another surface that has a pattern.

In some embodiments, a line of the invention will have an advancing contact angle with deionized water of at least about 125°, preferably at least about 135°, and most preferably at least about 150° or more. In contrast to previously known fishing lines of which we are aware, none having an advancing contact of more than about 115°.

Formation of features in the outer surface of a line in accordance with the invention has been observed to increase the advancing contact angle with water of the line. Some illustrative examples are shown below showing the increase imparted to lines by formation of features as described herein.

| Line | Advancing Contact Angle in | |
|---|---|---|
| | Conventional | With Array of Features |
| 1 | 96.0° | 117.5° |
| 2 | 79.3° | 117.1° |
| 3 | 93.0° | 109.9° |
| 4 | 94.8° | 118.1° |
| 5 | 89.7° | 109.1° |

The foregoing shows an effect upon properties of a line imparted by the features alone. In addition, in some embodiments a line with features in accordance with the invention can be treated with water-repellent material, e.g., a thin coating thereover (which does not unduly impart the desired geometry of the surface features, an additive incorporated in the outer layer of the line, etc.

Many suitable hydrophobic treatment can be selected to generate desired increases in advancing water contact angles in accordance with the present invention. Material that are used to impart dynamic water repellency to raincoats and boots are typically preferred for use in this invention. Suitable materials can be selected from the groups consisting of silicones, some hydrocarbons, and fluorochemicals. If fluorochemical compositions are used they are preferably of a non-bioaccumulating and are environmentally friendly character. Such materials will also impart good dirt release properties to the fly line, thereby making for easier cleaning One illustrative material is a urethane acrylate emulsion made from HFPO alcohol (e.g., 15 eq. of HFPO-C(O)NHCH2CH2OH) and pentaeritoltriacrylate (e.g., 90 eq.) cured with isocyanate (e.g., 100 eq. DESOMODUR™ N-100) then free-radically polymerized with HFPO methacrylate. HFPO-C(O)N(H)CH2CH2OC(O)CMe═CH2 ("HFPO-Mar"), average molecular weight 1344) was prepared by a procedure similar to that described in U.S. Publication No. 2004-0077775, entitled "Fluorochemical Composition Comprising a Fluorinated Polymer and Treatment of a Fibrous Substrate Therewith," filed on May 24, 2002, for Synthesis of (HFPO)x-methacrylate. This reference is incorporated herein by reference in its entirety.

The resultant urethane acrylate is an emulsion in water known to have high advancing and receding contact angles to water after heat curing. After application (e.g., dip coating) and drying, the coated line is heat cured at 150° C. for 4 minutes to allow the low energy surface properties to develop.

Another suitable emulsion is the C14 polyester emulsion disclosed in U.S. Pat. No. 6,753,380 (Qiu) which is incorporated herein by reference in its entirety.

Various modifications and alterations of this invention will become apparent to those skilled in the art without departing from the scope and spirit of this invention.

What is claimed is:

1. A fishing line comprising an outer surface having at least one array of shaped features therein and having an advancing contact angle with deionized water of at least about 115°; wherein the array comprises a plurality of discrete shaped features spaced equidistantly along a longitudinal axis of the fishing line, and wherein the shaped features are from about 0.005 to about 0.02 inches across in their broadest dimension.

2. The fishing line of claim 1 wherein said outer surface is defined by a polymeric outer layer.

3. The fishing line of claim 2 wherein said outer layer is substantially continuous.

4. The fishing line of claim 2 wherein said outer layer surrounds one or more core elements.

5. The fishing line of claim 1 wherein said line is selected from the group consisting of monofilament and polyfilament lines.

6. The fishing line of claim 5 wherein said line is a composite line.

7. The fishing line of claim 1 wherein said array comprises at least one series of shaped features arranged substantially along the longitudinal axis of said fishing line.

8. The fishing line of claim 1 wherein said array comprises two or more series of shaped features per longitudinal segment.

9. The fishing line of claim 1 wherein at least two longitudinal segments of the line have different arrays of shaped features.

10. The fishing line of claim 1 wherein said outer surface has an advancing contact angle with deionized water of at least about 125°.

11. The fishing line of claim 10 wherein said outer surface has an advancing contact angle with deionized water of at least about 135°.

12. The fishing line of claim 11 wherein said outer surface has an advancing contact angle with deionized water of at least about 150°.

* * * * *

UNITED STATES PATENT AND TRADEMARK OFFICE
CERTIFICATE OF CORRECTION

PATENT NO.        : 8,276,312 B2
APPLICATION NO.   : 12/663298
DATED             : October 2, 2012
INVENTOR(S)       : Jeffrey Lynn Wieringa et al.

It is certified that error appears in the above-identified patent and that said Letters Patent is hereby corrected as shown below:

Title page,
Item [75], Inventors:, delete "Daniel R. Croswell, Brooklyn Park, MN (US);" and insert -- Daniel R. Croswell, Brooklyn Park, deceased, MN (US); --, therefor.

Column 4,
Line 52, after "operations" insert -- . --.

Column 6,
Line 30, after "cleaning" insert -- . --.
Line 33, delete "pentaeritoltriacrylate" and insert -- pentaerythritoltriacrylate --, therefor.
Line 34, delete "DESOMODUR™" and insert -- DESMODUR™ --, therefor.

Signed and Sealed this
Nineteenth Day of March, 2013

Teresa Stanek Rea
*Acting Director of the United States Patent and Trademark Office*